(12) United States Patent
Lipke et al.

(10) Patent No.: US 11,410,242 B1
(45) Date of Patent: Aug. 9, 2022

(54) ARTIFICIAL INTELLIGENCE SUPPORTED VALUATION PLATFORM

(71) Applicant: MASSACHUSETTS MUTUAL LIFE INSURANCE COMPANY, Springfield, MA (US)

(72) Inventors: David Lipke, Springfield, MA (US); Nailong Zhang, Springfield, MA (US)

(73) Assignee: MASSACHUSETTS MUTUAL LIFE INSURANCE COMPANY, Springfield, MA (US)

(*) Notice: Subject to any disclaimer, the term of this patent is extended or adjusted under 35 U.S.C. 154(b) by 303 days.

(21) Appl. No.: 16/702,102

(22) Filed: Dec. 3, 2019

Related U.S. Application Data

(60) Provisional application No. 62/774,829, filed on Dec. 3, 2018.

(51) Int. Cl.
```
G06Q 40/06      (2012.01)
G06F 16/951     (2019.01)
G06K 9/62       (2022.01)
G06F 17/18      (2006.01)
```
(52) U.S. Cl.
CPC ........... *G06Q 40/06* (2013.01); *G06F 16/951* (2019.01); *G06F 17/18* (2013.01); *G06K 9/6257* (2013.01); *G06K 9/6276* (2013.01)

(58) Field of Classification Search
CPC ........ G06Q 40/06; G06F 16/951; G06F 17/18
See application file for complete search history.

(56) References Cited

U.S. PATENT DOCUMENTS

| | | | |
|---|---|---|---|
| 9,336,302 B1* | 5/2016 | Swamy | G06F 16/355 |
| 2018/0082183 A1* | 3/2018 | Hertz | G06Q 10/10 |
| 2018/0157940 A1* | 6/2018 | Yang | G06K 9/00268 |
| 2018/0349364 A1* | 12/2018 | Arnold | G06F 16/2455 |
| 2019/0206575 A1* | 7/2019 | Batey | G06K 9/6262 |

* cited by examiner

*Primary Examiner* — Scott C Anderson
(74) *Attorney, Agent, or Firm* — Foley & Lardner LLP

(57) ABSTRACT

Disclosed are method and systems to program a server to identify the value of a fund comprising shares of multiple private entities. The server receives transaction data associated with a fund where the transaction data identifies a proportion of shares within the fund associated with each private entity, price per share of each private entity, and other relevant data. The server then executes multiple artificial intelligence models to identify comparable public entities to each private entity. The server then retrieves stock price data for each public entity and calculates a value for each private entity in real time. The server also displays a value of the fund in real time where identification of each private entity is anonymized.

20 Claims, 12 Drawing Sheets

| 440 | 422 | 423 | 424 | 425 | 426 |
|---|---|---|---|---|---|
| 422 | 0 | 5.1 | 4.6 | 3.2 | 4.1 |
| 423 | 5.1 | 0 | 2.6 | 2.8 | 0.7 |
| 424 | 4.6 | 2.6 | 0 | 2.4 | 1.3 |
| 425 | 3.2 | 2.8 | 2.4 | 0 | 1.1 |
| 426 | 4.1 | 0.7 | 1.3 | 1.1 | 0 |

FIG. 4B

ARTIFICIAL INTELLIGENCE SUPPORTED VALUATION PLATFORM

CROSS REFERENCE TO RELATED APPLICATIONS

This application claims priority to U.S. Provisional Application No. 62/774,829, filed Dec. 3, 2018, which is incorporated herein in its entirety.

TECHNICAL FIELD

This application relates generally to generating, training, and operating artificial intelligence models to achieve better valuations.

BACKGROUND

Conventional portfolio valuation methods are subjective, inaccurate, and tedious. In a conventional method, valuation of different portfolios that include shares of multiple companies is achieved using each portfolio (or closed end funds) manager's subjective understanding of the market. For instance, a closed end fund manager examines which companies are included within a portfolio, retrieves and monitors relevant market data, and determine a value for each company and the portfolio. This conventional method is undesirable because the portfolio valuation is highly biased based on each portfolio manager's skills. Therefore, the above-mentioned method results in inconsistent and highly unreliable portfolio valuations. Furthermore, this method is very inefficient and time-consuming. In high-pressure and time-sensitive environments, where many factors regarding a portfolio and its underlying companies may change within seconds, time plays an important role. However, existing methods have failed to provide timely, consistent, or accurate results.

As the processing power of computers has expanded, many have created software solutions to combat the above-mentioned technical challenges. However, the conventional technical solutions (e.g., software solutions) to the subjectivity, accuracy, and timeliness problems described above have also faced several technical shortcomings. For instance, many software solutions use public information to predict market conditions to evaluate a portfolio. For example, current clustering methods (e.g., K nearest neighbor algorithms) identify a similar company (e.g., or the most similar company) to a given private entity and predict the value of the given company based on the identified similar company. While these methods are generally appropriate for clustering data point and for identifying similarities between data points, existing artificial intelligence (AI) modeling methods are not suitable for portfolio valuation platforms. First, existing AI modeling methods do not produce highly accurate results because they valuate companies based on other similar companies. Second, existing AI modeling technique may require large processing power, which is costly and inefficient.

SUMMARY

For the aforementioned reasons, there is a desire for an artificial intelligence supported method utilizing an improved AI modeling technique to evaluate portfolios. What is desired is an AI modeling technique that is more efficient and produces more accurate results. What is also needed is a platform that displays company valuations in a timely manner.

In an embodiment, a method comprises receiving, by a server, transaction data associated with a fund comprising a plurality of private entities, the transaction data corresponding to a proportion of the fund associated with each private entity, shares purchased of each private entity, and purchase price for the shares purchased of each private entity; executing, by a server, a set of artificial intelligence models to identify a plurality of comparable public entities to each private entity, the set of models comprising at least a first artificial intelligence model utilizing a learned distance k-nearest algorithm to identify the plurality of comparable public entities, a second artificial intelligence model utilizing a linear regression algorithm to identify the plurality of comparable public entities, and a third artificial intelligence model utilizing a boosting tree regression algorithm to identify the plurality of comparable public entities; retrieving, by the server, financial data associated with the identified public entities; determining, by the server, a value for each private entity based upon its respective identified plurality of public entities; and displaying, by the server on a graphical user interface in real time, an indicator of a value of the fund, the graphical user interface comprising a value of each private entity within the fund where an identify of each private entity is anonymized.

In another embodiment, a computer system comprises one or more electronic data sources configured to store financial data associated with a set of public entities; and a server connected to the one or more electronic data sources, the server configured to receive transaction data associated with a fund comprising a plurality of private entities, the transaction data corresponding to a proportion of the fund associated with each private entity, shares purchased of each private entity, and purchase price for the shares purchased of each private entity; execute a set of artificial intelligence models to identify a plurality of comparable public entities to each private entity, the set of models comprising at least a first artificial intelligence model utilizing a learned distance k-nearest algorithm to identify the plurality of comparable public entities, a second artificial intelligence model utilizing a linear regression algorithm to identify the plurality of comparable public entities, and a third artificial intelligence model utilizing a boosting tree regression algorithm to identify the plurality of comparable public entities; retrieve, from the one or more electronic data sources, financial data associated with the identified public entities; determine a value for each private entity based upon its respective identified plurality of public entities; and display, on a graphical user interface in real time, an indicator of a value of the fund, the graphical user interface comprising a value of each private entity within the fund where an identify of each private entity is anonymized.

In another embodiment, a method comprises generating, by a server, an artificial intelligence model comprising a neural network corresponding to at least two sets of data points, each data point within a first set of data points corresponding to a first variable that is independent and each data point within a second set of data points corresponding to a second variable where each second variable is dependent upon a corresponding first variable; executing, by the server, a clustering algorithm to generate a plurality of clusters where each cluster corresponds to at least one data point within the set of data points; generating, by the computer, a training dataset comprising a third set of data points where each data point within the third set of data points corresponds to a pairwise distance between each two data points within at least one cluster; and training, by the server, the artificial intelligence model based on the training dataset, wherein when the trained artificial intelligence mode is executed using a new data point having a first independent variable, the artificial intelligence model identifies a distance between the new data point and at least one data point within the cluster.

In another embodiment a computer system comprises a database configured to store a training dataset; and a server in communication with the database, wherein the server is configured to generate an artificial intelligence model comprising a neural network corresponding to at least two sets of data points, each data point within a first set of data points corresponding to a first variable that is independent and each data point within a second set of data points corresponding to a second variable where each second variable is dependent upon a corresponding first variable; execute a clustering algorithm to generate a plurality of clusters where each cluster corresponds to at least one data point within the set of data points; generate a training dataset comprising a third set of data points where each data point within the third set of data points corresponds to a pairwise distance between each two data points within at least one cluster; and train the artificial intelligence model based on the training dataset, wherein when the trained artificial intelligence mode is executed using a new data point having a first independent variable, the artificial intelligence model identifies a distance between the new data point and at least one data point within the cluster.

BRIEF DESCRIPTION OF THE DRAWINGS

Non-limiting embodiments of the present disclosure are described by way of example with reference to the accompanying figures, which are schematic and are not intended to be drawn to scale. Unless indicated as representing the background art, the figures represent aspects of the disclosure.

FIGS. 4A-B illustrate conventional clustering methods, according to an embodiment.

DETAILED DESCRIPTION

Figure 1:
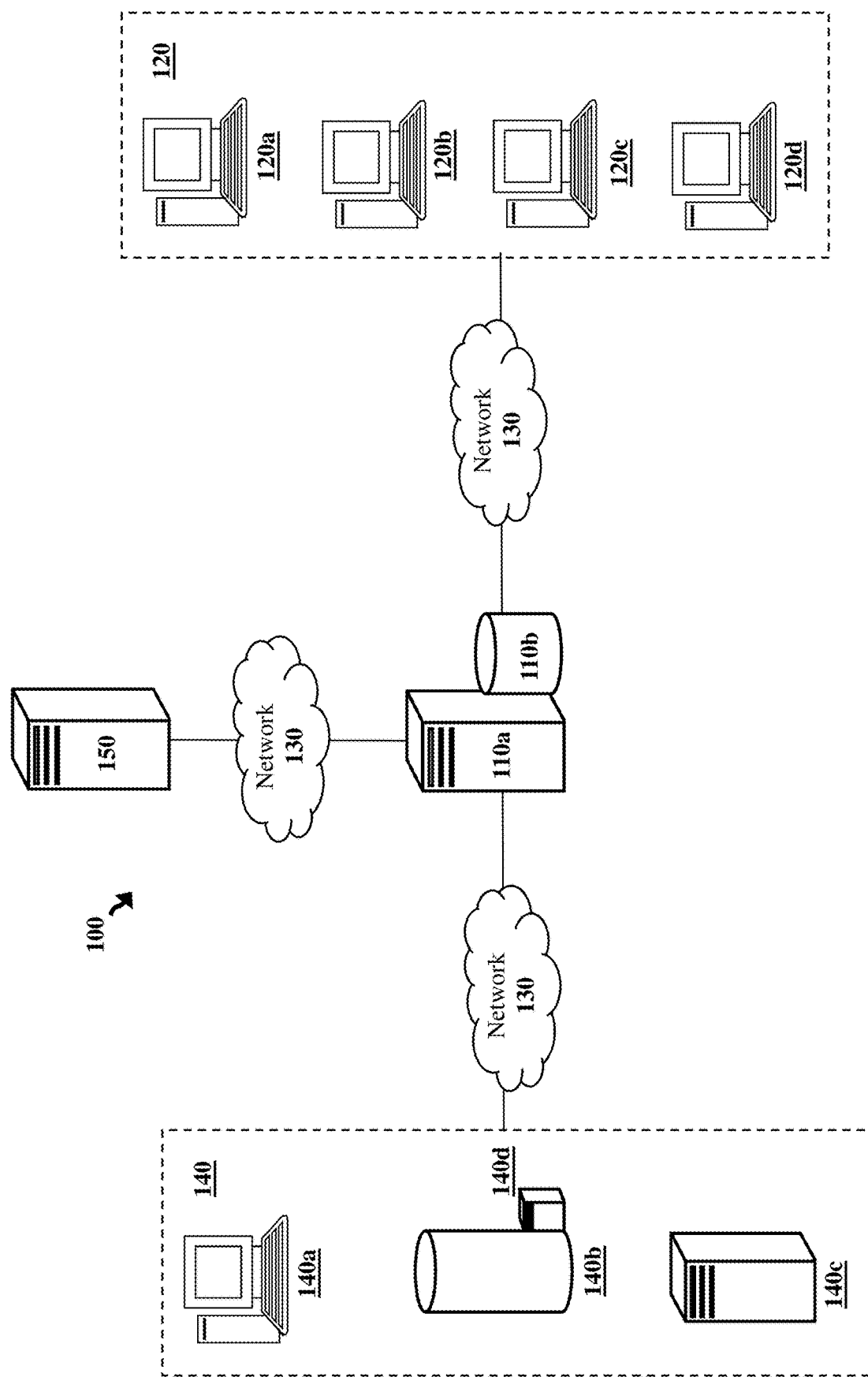
FIG. 1 illustrates components of an artificial intelligence (AI) supported valuation system, according to an embodiment.

Reference will now be made to the illustrative embodiments depicted in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one skilled in the relevant art and having possession of this disclosure, are to be considered within the scope of the subject matter disclosed herein. Other embodiments may be used and/or other changes may be made without departing from the spirit or scope of the present disclosure. The illustrative embodiments described in the detailed description are not meant to be limiting of the subject matter presented.

FIG. 1 illustrates components of an AI supported valuation system 100. The system 100 may include an analytics server 110a, system database 110b, user computing devices 120a-d (collectively user computing devices 120), electronic data sources 140a-c (collectively electronic data source 140), and trading server 150. The above-mentioned components may be connected to each other through a network 130. The examples of the network 130 may include, but are not limited to, private or public LAN, WLAN, MAN, WAN, and the Internet. The network 130 may include both wired and wireless communications according to one or more standards and/or via one or more transport mediums.

The communication over the network 130 may be performed in accordance with various communication protocols such as Transmission Control Protocol and Internet Protocol (TCP/IP), User Datagram Protocol (UDP), and IEEE communication protocols. In one example, the network 130 may include wireless communications according to Bluetooth specification sets, or another standard or proprietary wireless communication protocol. In another example, the network 130 may also include communications over a cellular network, including, e.g., a GSM (Global System for Mobile Communications), CDMA (Code Division Multiple Access), EDGE (Enhanced Data for Global Evolution) network.

The system 100 is not confined to the components described herein and may include additional or alternate components, not shown for brevity, which are to be considered within the scope of the embodiment.

The analytics server 110a may generate and display a private equity (PE) platform graphical user interface (GUI) on each user computing device 120. An example of the trading GUI generated and hosted by the analytics server 110a may be a web-based application or a website configured to be displayed on different electronic devices, such as mobile devices, tablets, personal computer, and the like. The analytics server 110a may host a website accessible to end-users, where the content presented via the various webpages may be controlled based upon each particular user's role or viewing permissions. The analytics server 110a may be any computing device comprising a processor and non-transitory machine-readable storage capable of executing the various tasks and processes described herein. Non-limiting examples of such computing devices may include workstation computers, laptop computers, server computers, laptop computers, and the like. While the system 100 includes a single analytics server 110a, in some configurations, the analytics server 110a may include any number of computing devices operating in a distributed computing environment.

The analytics server 110a may execute software applications configured to display the trading GUI (e.g., host a website), which may generate and serve various webpages to each user computing device 120. Different users operating the user computing devices 120 may use the website to view entity/portfolio valuations, transmit bids and/or purchase requests.

In some implementations, the analytics server 110a may be configured to require user authentication based upon a set of user authorization credentials (e.g., username, password, biometrics, cryptographic certificate, and the like). In such implementations, the analytics server 110a may access the system database 110b configured to store user credentials, which the analytics server 110a may be configured to reference in order to determine whether a set of entered credentials (purportedly authenticating the user) match an appropriate set of credentials that identify and authenticate the user.

In some configurations, the analytics server 110a may generate and host webpages based upon a particular user's role within the system 100 (e.g., administrator, employee, and/or bidder). In such implementations, the user's role may be defined by data fields and input fields in user records stored in the system database 110b. The analytics server 110a may authentication the user and may identify the user's role by executing an access directory protocol (e.g. LDAP). The analytics server 110a may generate webpage content that customized according to the user's role defined by the user record in the system database 110b. For instance, a user may not have proper authorization to view certain entities valuations. In another example, a user may not be able to transmit purchase requests regarding one or more prohibited entities or one or more portfolios including certain prohibited private entities.

The electronic data sources 140 may represent various electronic data sources that contain data associated with private entities. For instance, database 140c and third-party server 140b may represent database/server having private or public market data associated with different private entities. Non-limiting examples of database 140c may include databases continuously updated with market data (e.g., S&P 500). In some non-limiting examples, as described below, data associated with private entity may be inputted by a user operating the computing device 140a. For instance, an administrator may input various public or nonpublic data into a graphical user interface displayed on the computing device 140a where the analytics server 110a may use the inputted data to valuate a portfolio. In some embodiments, the analytics server 110a may utilize the application programming interface (API) 140d to monitor market data within the electronic data sources 140.

User computing devices 120 may be any computing device comprising a processor and a non-transitory machine-readable storage medium capable of performing the various tasks and processes described herein. Non-limiting examples of a network node may be a workstation computer, laptop computer, tablet computer, and server computer. In operations, various users may use computing devices 120 to access the trading GUI operationally managed by the analytics server 110a. Using the trading GUI, each computer may view valuation of different private entities and different portfolios.

In operation, the analytics server 110a may periodically scan data stored on the electronic data sources 140 and may retrieve attributes associated with different public and private entities. The analytics server 110a may also generate, train, and update an AI model configured to use data retrieved from the electronic data sources 140 to generate an accurate valuation of one or more private entities. Upon executing the AI model, the analytic server may populate a private equity (PE) platform GUI where different users operating computing devices 120 may access the PE platform GUI to view different customizable valuations.

The analytics server 110a may update the PE platform GUI in real time or in near real time. As described below, the PE platform GUI may comprise various price indicators (e.g., tickers) updated in real-time or near real-time. The analytic server 110a may provide users operating computing devices 120 the option to customize the price indicators or display the price indicators in relation to other customizable private entities and or portfolios. As described below, price indicators are graphical representations of the valuation of a private entity or a portfolio that may be anonymized.

Therefore, similar to public trading, a user operating the computing devices 120 may also transmit a purchase order using the PE platform GUI. Upon receiving the purchase order, the analytics server 110a may transmit the purchase order, along with different attributes of the purchase order such as amount, limit pricing, volume, call/option pricing, and the like, to a trading server 150. The trading server 150 may then facilitate a transaction using data received from the analytics server 110a. For instance, the trading server 150 may transmit payments from the requesting party and may issue purchase confirmation once the transaction is completed.

Even though the analytics server 110a and the trading server 150 are shown as two separate computing devices/servers, it is expressly understood that in some configurations, the analytics server 110a may perform the functionality described as being performed by the trading server 150. For instance, the trading server 150 may be a module of the analytics server 110a.

Figure 2:
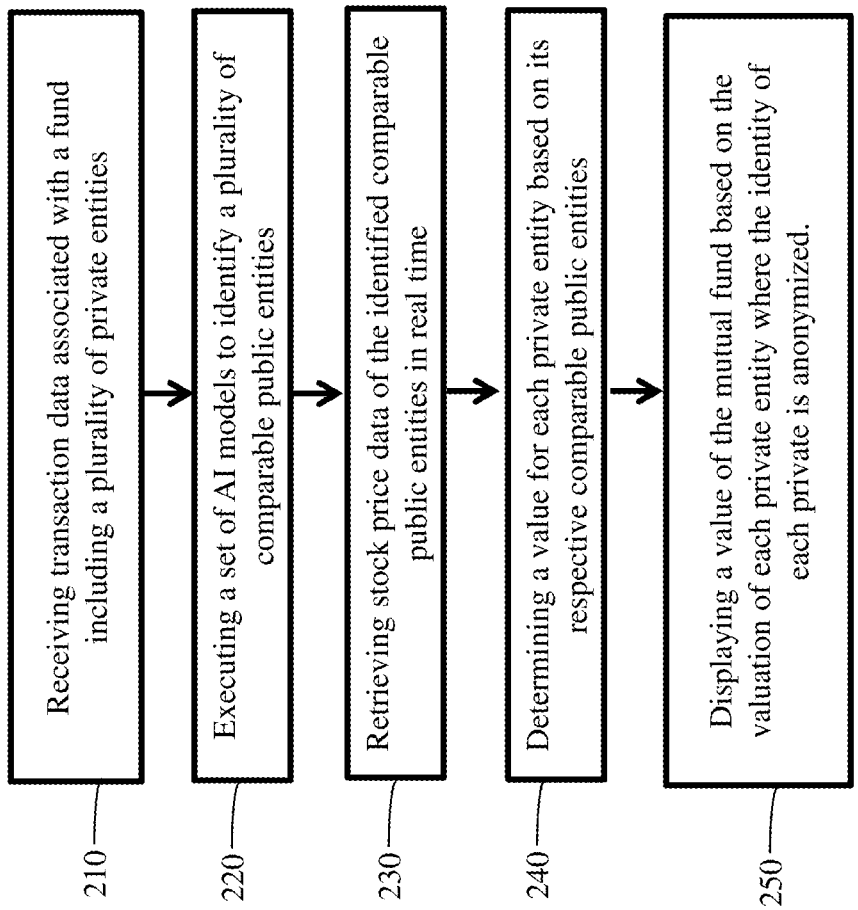
FIG. 2 illustrates a flow diagram of a process executed in an AI supported valuation system, according to an embodiment.

FIG. 2 illustrates a flow diagram of a process executed in an AI supported valuation system, according to an embodiment. The method 200 includes steps 200-250. However, other embodiments may include additional or alternative execution steps, or may omit one or more steps altogether. In addition, the method 200 is described as being executed by a server, similar to the analytics server described in FIG. 1. However, steps of method 200 may also be executed by any number of computing devices operating in the distributed computing system described in FIG. 1. For instance, one or more user computing devices may locally perform part or all the steps described in FIG. 2.

Even though some aspects of the embodiments described herein are described within the context of generic funds, it is expressly understood that methods and systems described herein apply to all AI supported financial valuations. For instance, in other embodiments, the methods and systems described herein may be applied to securities, valuations of public or private entities, bonds, stocks, and other financial instruments and portfolios that include multiple instruments belonging to diverse entities. The analytics server may utilize the methods and systems described herein to value private portfolio companies, private equity funds and then funds of private equity funds, which could be closed end funds, open ended funds, or other types of pool investment vehicles.

At step 210, the analytics server may receive transaction data associated with one or more funds of private portfolio companies (hereafter referred to as "fund"). The transaction data may include any financial/transaction data associated with an existing fund. The fund being evaluated may be an investment vehicle consisting a pool of money collected from many investors for investing in securities such as stocks, bonds, money market instruments and other assets (e.g., shares within one or more private entities). The fund may be operated by one or more managers (administrator), who may allocate the fund's investments and attempt to produce capital gains and/or income for the fund's investors. The fund's portfolio may be structured and maintained to match the investment objectives stated in its prospectus. The fund's portfolio may include shares of private entities that are not publicly traded. For instance, an administrator may acquire multiple shares of a private entity as an investment of the fund. Therefore, the "fund" may refer to (but not limited to) a shares of a private entity and/or a closed end fund.

The transaction data may generally refer to information regarding the fund' portfolio and may include data associated with one or more private entities within the fund's portfolio, such as a proportion of the fund associated with each private entity, number of shares purchased from each private entity, price per share for each private entity, a value of each private entity estimated by an administrator of the fund.

In an embodiment, an administrator of a fund may login a web-based application operated/provided by the analytics server to input the above-described fund data. For instance, the administrator may login a website to access the analytics server and input various fund portfolio information. The website may include various prompts and input components (e.g., radio buttons, and text input fields) where the administrator can input various attributes of one or more funds. The received data may include a list of private entities (and a respective proportion of each private entity) within a fund. For instance, the administrator may access the web-based application and indicate that fund X comprises three private entities (entity A-C). The administrator may also input the following data:

TABLE 1

| Private Entity | Ratio | Fund's Valuation | Number of Shares owned | Number of Outstanding Shares | NAV | Price Per Private Entity |
|---|---|---|---|---|---|---|
| A | 25% | $1.0M | 3000 | 10,000 | $100 | $300,000 |
| B | 25% | $1.5M | 5000 | 25,000 | $60 | $300,000 |
| C | 50% | $12M | 250 | 5000 | $2400 | $600,000 |
| Total Value of Fund | | | | | | $1.2M |

As described in table 1, inputted data indicates that fund X includes three private entities A-C. More specifically, the inputted data indicates that fund X owns 1000 shares of private entity A, 5000 shares of private entity B, and 250 shares of private entity C. The administrator further inputs a fair valuation of each private entity (at least partially) owned by fund X. For instance, the administrator inputs that administrators managing fund X have estimated private entity A to be valued at $1 million, private entity B at $1.5 million, and private entity C at $2.5 million. The administrator may also input a total number of outstanding shares for each private entity as illustrated in table 1. For instance, private entity B may have 25,000 outstanding shares. In some other implementations, the analytics server may query and retrieve the outstanding shares from public or private databases.

The administrator may also input (or the analytics server may calculate) a net asset value (NAV) associated with each private entity. A NAV may represent a fund per-share market value. For instance, NAV may represent a monetary value at which investors purchase fund shares from the fund company. The NAV value for a private entity may be derived by dividing the total value of all the cash and securities owned by the private entity, while accounting for any liabilities, and dividing that by a number of an entity's outstanding shares. Therefore, the NAV for a private entity can be calculated based on the following formula:

$$NAV=(assets-liabilities)/\text{number of outstanding shares}$$

For instance, the administrator of fund X values private entity A at $1.0 million where the private entity A has 10,000 outstanding shares. Therefore, the analytics server determines the NAV for private entity A to be $100 per share.

As illustrated in table 1, fund X comprises shares associated with different private entities where these shares are not equally distributed among different private entities. For instance, private entity A and B each comprises 25% of the overall value of fund X. In contrast, private entity C comprises 50% of the value of fund X. These proportions may also be inputted by the administrator as part of the portfolio and transaction data. Accordingly, the analytics server may use fund X's attributes to determine a value for fund X. For instance, the analytics server may use the inputted values to generate an overall value for fund X. For instance, as depicted in Table 1, the analytics server determines that fund X has an overall value of $1.2 million. As described above, this value is based on the administrator's evaluation of the private entities within fund X. Therefore, $1.2 million is how the administrator has valuated fund X. As described below, the analytics server may use this value as a benchmark to compare with the value calculated using the AI models.

The analytics server may generate a dataset comprising various data records where each data record corresponds to an attribute (inputted by the administrator or calculated by the analytics server) of the fund. For instance, the analytics server may generate a dataset corresponding to the attributes illustrated in table 1. The analytics server may also store the dataset in an internal (e.g., local) or external electronic data repository.

At step 220, the analytics server may execute a set of artificial intelligence models to identify a plurality of comparable public entities to each private entity within the fund. The analytics server may execute the set of AI models to identify one or more comparable public entities. As discussed below, the analytics server may use publicly available data (e.g., financial data associated with publicly traded companies, trading data) to identify the comparable public entities and to predict a value for each private entity within the fund.

Figure 3A:
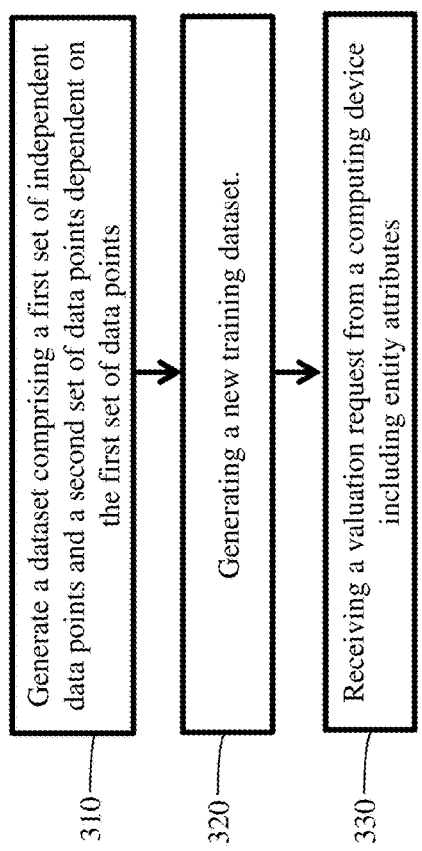
FIGS. 3A-B illustrate flow diagrams of a process executed by an AI model to improve valuation accuracy, according to an embodiment.

The set of AI models may include three separate models where each model may comprise a separate neural network trained via different algorithms. For example, a first AI model may comprise a first neural network that utilizes a distance K nearest neighbor (DKNN) algorithm to cluster various data points and identify one or more public entities that are comparable to each private entity within the fund. The DKNN algorithm is further described in FIGS. 3A-C.

The set of AI models may also include a second AI model having a second neural network that utilizes linear regression models to identify one or more public entities that are comparable to each private entity within the fund. A linear regression model is a linear approach to modelling the relationship between a scalar response (dependent variable) and one or more explanatory variables (independent variables). In linear regression modeling, the relationships are modeled using linear predictor functions whose unknown model parameters are estimated from the data. The second AI model may utilize a supervised machine-learning algorithm to adapt to various data points and improve its efficiency and accuracy. Supervised learning is the machine-learning task of learning a function that maps an input to an output based on example input-output pairs. A supervised learning algorithm analyzes the training data and produces an inferred function, which can be used for mapping new examples.

The analytics server may generate the second AI model using historical data associated with public entities. The analytics server may also train the second AI model using supervised linear regression machine learning algorithms. The analytics server may first create a neural network where each node represents historical financial information (e.g., stock prices and/or bond prices) of a publicly traded entity. Subsequently, the analytics server may train the model to predict and identify a comparable public entity when attributes of a private entity is inputted. For instance, the analytics server may retrieve various attributes associated with a private entity and the second AI model may identify/predict a comparable public entity. A public entity, as used herein, refers to any publicly traded company or a company with publicly accessible financial status/reports.

The set of AI models may also include a third neural network utilizing a boosting tree regression model to identify one or more public entities that are comparable to each private entity within the fund. Gradient boosting is a machine learning technique for regression and classification problems, which produces a prediction model in the form of decision trees. For instance, the analytics server may build binary trees by partitioning the data into two samples at each split node where each node represents a data point. Using the tree (e.g., traversing the tree) the analytics server may predict an outcome when presented with input data.

Similar to the other AI models within the set of AI models, the analytics server may generate the third AI model based on historical financial information associated with publicly traded entities. The analytics server may train the third AI model using a Gradient Boosting Algorithm. When the analytics server successfully trains the third AI model, the analytics server may input attributes of a private entity into the third AI model where the third AI model identifies/predicts a comparable public entity.

The analytics server may simultaneously execute all three models where each model may predict one or more comparable public entities. The analytics server may determine one or more comparable public entities based on the output of each model. For instance, the analytics server may consider all public entities identified by each model. In some embodiments, the analytic server may only consider an entity as a comparable public entity if a predetermined number of AI models (e.g., two or all three of the AI models) have identified the public entity as a comparable public entity. For instance, for an entity to be considered as a comparable public entity, the entity must be identified by at least two of the three AI models.

In a non-limiting example, the analytics server may retrieve various attributes of private entity A and may execute all three AI models to identify/predict comparable public entities. Upon executing the set of AI models, each AI model predicts the following public entities, as illustrated in table 2.

TABLE 2

| DKNN | Linear Regression Model | Gradient Boosting Model |
|---|---|---|
| Public Entity - A/B/C | Public Entity A/C | Public Entity B/C/D |

As discussed above, when different AI models predict different public entities, the analytic server may either consider all public entities identified by all AI models (A, B, C, and D), public entities common among all three AI models (public entity A), or public entities identified by at least two models (public entity A and C). Upon identifying comparable public entities, the analytics server may update the funds dataset accordingly.

In some configurations, the analytics server may sequentially execute the evaluation methods described above to determine a public entity closely resembling a private entity. In some other configurations, the analytics server may only use a selected number of models (e.g., two models).

At step 230, the analytics server may continuously retrieve financial transaction data of the identified comparable public entities in real time. The analytics server may retrieve the dataset including the list of all identified comparable public entities associated with the fund. Subsequently, the analytics server may retrieve financial transaction data associated with the identified comparable public entities from various data sources. For instance, the analytics server may continuously scan one or more electronic data repositories to retrieve a real time stock price of each comparable public entity.

In some configurations, the analytics server may retrieve comparable public entity data utilizing one or more application programming (API) interfaces in communication with one or more electronic sources. For instance, the analytics server may receive a notification from one or more APIS when new and relevant data is identified. In a non-limiting example, an API may transmit a notification to the analytics server when the market share price on a specific trading platform for a predetermined publicly traded company (public entity) has changed. The analytics server may program an API to continuously scan financial data (e.g., stock tickers, commodities, and bonds) associated with the identified comparable public entities from various electronic sources. For instance, the API may continuously scan financial data in one or more electronic marketplaces (e.g., NASDAQ and/or New York Stock Exchange) or other third-party index providers (e.g., Dow Jones and/or S&P). When the API discovers a change in the market price, the API may transmit a notification including the new market price to the analytics server.

By allocating searching and notifying to multiple APIs, the analytics server may reduce the processing power needed by a single server. Furthermore, the trigger-based scanning allows the analytics server to provide timely and efficient data to consumers.

At step 240, the analytics server may determine a value for each private entity based on its respective comparable public entities. As discussed above, the analytics server uses multiple AI models to identify one or more comparable public entities. In some embodiments, the analytics server may consider data retrieved in step 230 (e.g., values of each identified comparable public entity) to determine a value for each private entity within the fund. The analytic server may weight or average the values of the identified public entities to calculate the value of the private entity. For example, as discussed above, the analytic server may identify public entities A and C as comparable public entities to private entity A within fund X. The analytics server may also retrieve all financial transaction data associated with public entity A and public entity C and may determine that public entity A is valued at $1.2 million while public entities A is valued at $1.0 million. The analytics server may average the above described values and determine that private entity A has a value of $1.1 million.

In some other embodiments, the analytics server may monitor the identified comparable public entities and adjust the value of the private entity accordingly. For instance, when the values of two public entities that are comparable to private entity A (public entity A and C) decrease by 15%, the analytics server may also decrease the value of the private entity A. The analytics server may decrease the value of private entity A by 15% or by a predetermined factor/weight (e.g., 0.5×15%).

The analytics server may also determine an updated value for the fund based on the newly calculated value of each private entity and the fund data received in step 210. For instance, when calculating a value for fund X, the analytics server may first calculate a value for private entities A-C and then evaluate the fund X based on each private entity's proportion within fund X, as described in table 3:

may also not be able to view the proportions associated with each private entity or the identified comparable public entities.

In order to anonymize the value of a private entity, the analytics server may aggregate or disaggregate one or more private entities and their corresponding valuations. For instance, the analytics server may aggregate the valuations for multiple private entities within a closed end fund. In this way, the analytics server ensures that a viewer cannot reverse engineer the overall valuation of a closed end fund to identify valuation of a single private entity. In a non-limiting example, the analytics server may determine that a closed fund contains shares for ten private entities. To anonymize the valuation of one or more private entities within the list of ten private entities, the analytics server may only provide a NAV for the closed end fund as a whole that does not include an itemized valuations.

In some configurations, the analytics server may delay the valuation process to prevent reverse engineering of a valuation. For instance, and continuing with the closed end fund example described above, when one of the ten private entities has had a publicly available event affecting its

TABLE 3

| Private Entity | Ratio | Fund's Valuation | Number of Shares Owned | Original NAV | Price Per Private Entity | AI model's Valuation | New NAV | New price Per Private Entity |
|---|---|---|---|---|---|---|---|---|
| A | 25% | $1.0M | 1000 | $100 | $300,000 | $1.1M | $110 | $330,000 |
| B | 25% | $1.5M | 5000 | $60 | $300,000 | $1.5M | $60 | $400,000 |
| C | 50% | $12M | 250 | $2400 | $600,000 | $12M | $2400 | $600,000 |
| Total Value | | | | | | $1.2M | | $1.23M |

As illustrated above, the analytics server executes the set of AI models and determines that private entity A is valued at $1.1 million. Accordingly, the analytics server calculates a new NAV value for private entity A ($110). The analytics server also determines that fund X's equity in private entity A is valued at $330,000 which is slightly above the previously calculated value by the administrator of the fund X ($300,000). As a result, the analytics server determines a new value for Fund X ($1.23 M).

At step 250, the analytics server may display the value of the fund based on the valuation of each private entity where the identity of the private entities are anonymized. As described above, the analytics server may calculate a new value for the funds based on the new predicted valuations of the private entities within the funds. The analytics server may populate a graphical user interface that displays the updated fund value. In some embodiments, the analytics server may anonymize one or more private entities. As a result, the analytics server may display a new value for a fund without displaying which private entity within the fund has an increased value.

In some configurations, the analytics server may not display the proprietary fund portfolio information inputted by the administrator (step 210). As a result, when users who do not have permission to view such proprietary information log in the web-based application, they may only see an overall valuation of the fund without being able to view any information associated with the underlying private entities. For instance, general users may not be able to view the name of the private entities within a fund or how many shares of the private entities are owned by the fund. General users valuation, the analytics server may delay its valuation of the closed end fund by a predetermined amount of time.

In some configurations, the analytics server may provide a disaggregated valuation that identifies a category associated with valuation of different private entities. For instance, and continuing with the closed end fund example described above, the analytics server may provide a valuation for all private entities (within the list of ten private entities) that fall within "technology" or "manufacturing" categories. By unmasking the valuation of different categories of various private entities, the analytics server may provide better insights to users without necessarily displaying individual valuation of the private entities. In some configurations, the analytics server may customize the valuation display based on instructions received from end users.

Figure 5:
FIG. 5 illustrate a graphical user interface of an AI supported valuation system, according to an embodiment.

Referring now to FIG. 5, a graphical user interface of the AI supported valuation system is illustrated, in accordance with an embodiment. In FIG. 5, a user logs in a web-based application provided by the analytics server to view GUI 500. The analytics server may customize the GUI based on user preferences and/or permissions. For instance, a user may not have permission to view the names of private entities contained within a fund and/or other features displayed within the GUI 500. In those embodiments, the analytics server may customize the GUI 500 so that the user in unable to view content for which the user does not have viewing permission.

The GUI 500 displays data related to four buyout funds, as illustrated in component 510. A buyout fund may refer to the process of obtaining capital to buy companies (e.g., public and/or private entities) or to acquire other assets (e.g., stocks and bonds). Buyout funds are generally a type of private equity funds. Therefore, many users may be interested in investing into a buyout fund based on its value. The GUI 500 allows users to view a real time valuation of the buyout fund including detailed anonymized information regarding the private entities within each fund of the buyout fund.

When the user interacts (e.g. clicks) on any of the buyout funds, the analytics server limits the display to data associated with the selected buyout fund. For instance, as illustrated in GUI 500, the user has interacted with Barings 2019 P E Buyout fund. As a result, the analytics server displays a NAV for the selected buyout fund. The analytics server may also display detailed information regarding the selected buyout fund in components 520-530. For instance, the selected buyout fund includes two funds (Boston Capital Partners and Springfield Capital Partners) where each fund may include an indicator 521 and 522 respectively. When the user interacts with the indicators 521 and/or 522, the analytics server may display anonymized detailed data regarding the private entities included in each fund.

For instance, as depicted in GUI 500, the user interacts with indicator 521. Consequently, the analytics server displays the component 530, which includes detailed information regarding the composition of the Boston Capital Partners fund. As described in component 530, Boston Capital Fund includes seven private companies (illustrated in column 531). As depicted, the analytics server may anonymize the private entities within Boston Capital Partners fund. As a result, the analytics server may display the overall NAV of the selected buyout fund and/or the selected fund without divulging specific information regarding each private entity.

The analytics server may also display NAV of each anonymized private entity (column 532), fair valuation of each private entity as determined by the selected fund administrator (column 533), and a value associated with each private entity's earnings before interest, taxes, depreciation, and amortization (EBITDA) in column 534. The purpose of the deductions in EBIDTA values is to remove the factors that business owners have discretion over such as debt financing, capital structure, methods of depreciation. In some embodiments, the EBIDTA value is inputted by an administrator of the selected fund.

The GUI 500 may also include a column 535 where the analytics server can provide different notifications and important details relevant to each anonymized private entity. For instance, the analytics server may display the indicator 536 indicating that the analytics server has identified new information regarding private entity 123. When the user interacts with indicator 536, the analytics server may display more detailed information regarding private entity 123.

In some embodiments, the analytics server may scan/crawl various publicly available data to identify material events to one or more private entities. The material events may be any event that could affect the valuation of a private entity. Non-limiting examples of a material events may include loss of key executive, addition of key executive, data breach, fraud, addition of key client, loss of key client, important regulatory changes, key geopolitical risk, material lawsuit reserve, natural disaster, and the like.

Using the GUI 500, the user may easily compare NAV calculated by the analytics server for a fund with the fair value estimated by the administrator of the fund. Additionally, the analytics server can display the NAV of a fund without divulging proprietary portfolio information. For instance, the GUI 500 may indicate that private entity 123 may have a lower value than anticipated by the administrator of Boston Capital Partners without indicating the identify of entity 123, a comparable public company to entity 123, or how many shares of entity 123 is owned by Boston Capital Partners.

The GUI 500 may be displayed for end users, where the end users can interact with various features and/or import the data directly into other software applications. For instance, data displayed in the GUI 500 can be populated in a home grown software where one or more graphical components are populated with data while preserving the look and feel of the homegrown software.

Additionally or alternatively, the GUI 500 may provide an option for the end users to approve, deny, or revise any of the predicted values. For instance, an end user (e.g., a close end fund manager) may review the NAV values and approve or deny the valuation generated by the analytics server. The end user may also revise the valuation generated by the analytics server. When the analytics server receives the valuation from the end user, the analytics server may use the revised value to train the machine learning models described herein. The analytics server may user various training methods to train one or more models.

The training of the machine learning models may be holistic or granular. For instance, the analytics server may train one or more models to generate revised values for a particular user. For instance, the analytics server may identify that a particular user always revises the valuation of a company and reduces the valuation by 20%. As a result, the analytics server may train the model to generate a reduced valuation corresponding to that particular user's preferences. However, the analytics server may only display the revised valuation for that particular user and display a different valuation for other users.

Additionally or alternatively, the analytics server may holistically train the machine learning algorithms and revise the models, such that all users view the revised value. For instance, when a predetermined number of (or proportion of) end users revise a value, the analytics server may train the model accordingly, such that all users will see a new valuation based on the received revised values from the end users.

Figure 6:
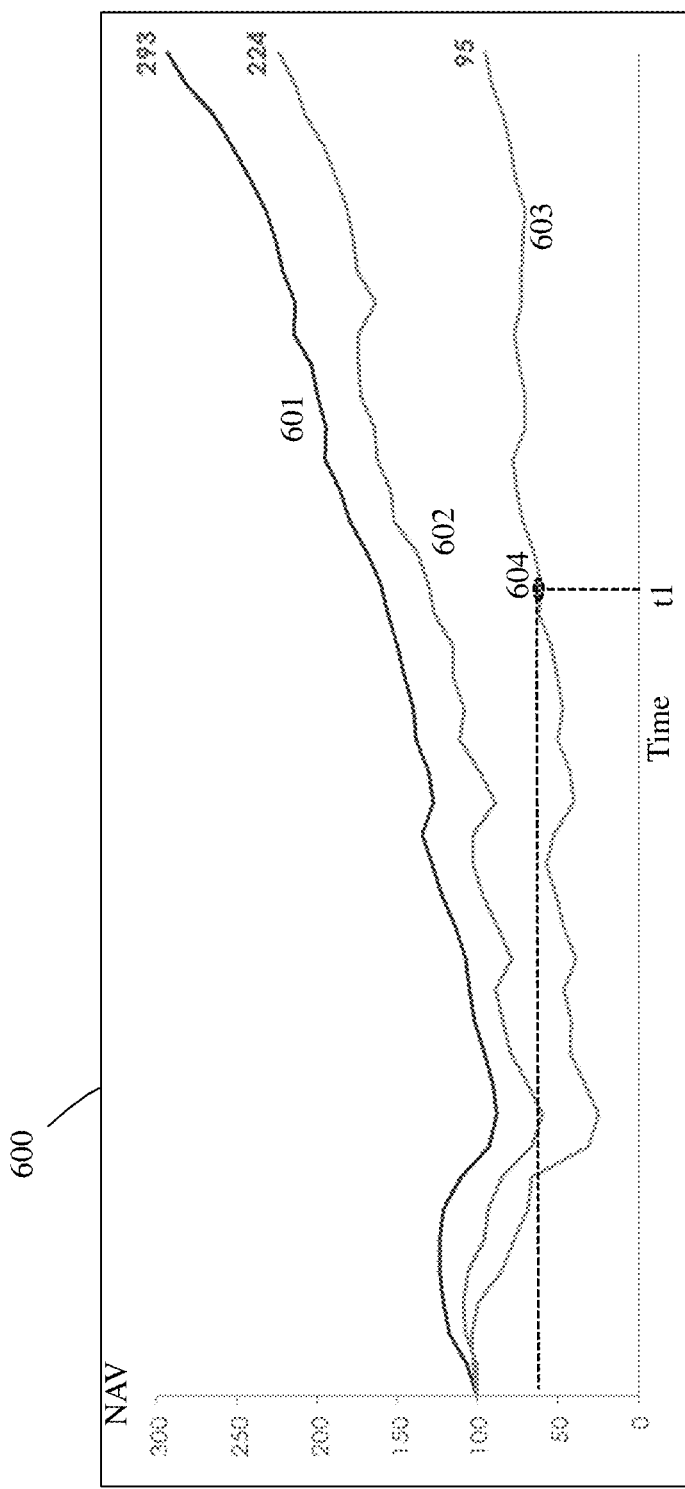
FIGS. 6-8 illustrate a graphical user interface of an AI supported valuation system, according to an embodiment.

In some embodiments, the analytics server may provide real-time updates of the above-mentioned valuations. Referring now to FIG. 6, a graphical user interface of the AI supported valuation system is illustrated, in accordance with an embodiment. GUI 600 illustrates NAV of different funds where the NAV is calculated utilizing the AI-based valuation methods disclosed herein. For instance, the analytics server may continuously perform the steps of method 200 and update NAV for one or more funds in real time. Accordingly, the analytic server may graphically represent NAV of one or more funds, as illustrated in GUI 600.

For instance, line 601, 602, and 603 may each represent a fund where each data point within these lines represents the NAV for the respective fund within a particular time. In the GUI 600, data point 604 represents that at time t1, the fund represented by line 603 had a NAV of $60 million. Using the real time updates and trends illustrated in GUI 600, a user may track NAV progress of a fund in real time. Even though GUI 600 illustrates NAV of different funds, users may customize the GUI 600 so that each line represents a customize value. As described above, the analytics server may anonymize the private entities contained within each fund so that proprietary data is not viewed by unauthorized users. For instance, the user viewing the GUI 600 may only view the NAV of the funds resented by lines 601-603 without viewing any underlying data (e.g., number or identify of the private entities within the fund).

In some embodiments, the analytics server may also display and continuously update an indicator (e.g., ticker) corresponding to the value of one or more funds. A ticker may refer to a report of the price for certain fund, updated continuously. A "tick" is any change in price, whether that movement is up or down. As a result, the analytics server may display real time NAV of one or more funds.

As described above, the AI model may account for all public information and compare a private entity to one or more comparable publicly traded companies. Therefore, in order to generate results in real time, the analytics server may continuously and iteratively scan various databases. In that way, the analytics server identifies the latest market movement and/or relevant data and iteratively and continuously updates the AI model.

Referring now to FIG. 3, a flow diagram of a process executed in an AI supported valuation system is illustrated, in accordance with an embodiment. The method 300 includes steps 300-330. However, other embodiments may include additional or alternative execution steps, or may omit one or more steps altogether. In addition, the method 300 is described as being executed by a server, similar to the analytics server described in FIG. 1. However, steps of method 300 may also be executed by any number of computing devices operating in the distributed computing system described in FIG. 1. For instance, one or more user computing devices may locally perform part or all the steps described in FIG. 3.

The method 300 describes an improvement to the existing and conventional artificial intelligence methods for clustering and predicting dependent values and variables. Therefore, the present disclosure first describes the technical shortcomings of conventional clustering methods (e.g., K nearest neighbor or KNN) before describing method 300 in more detail.

Figure 4A:
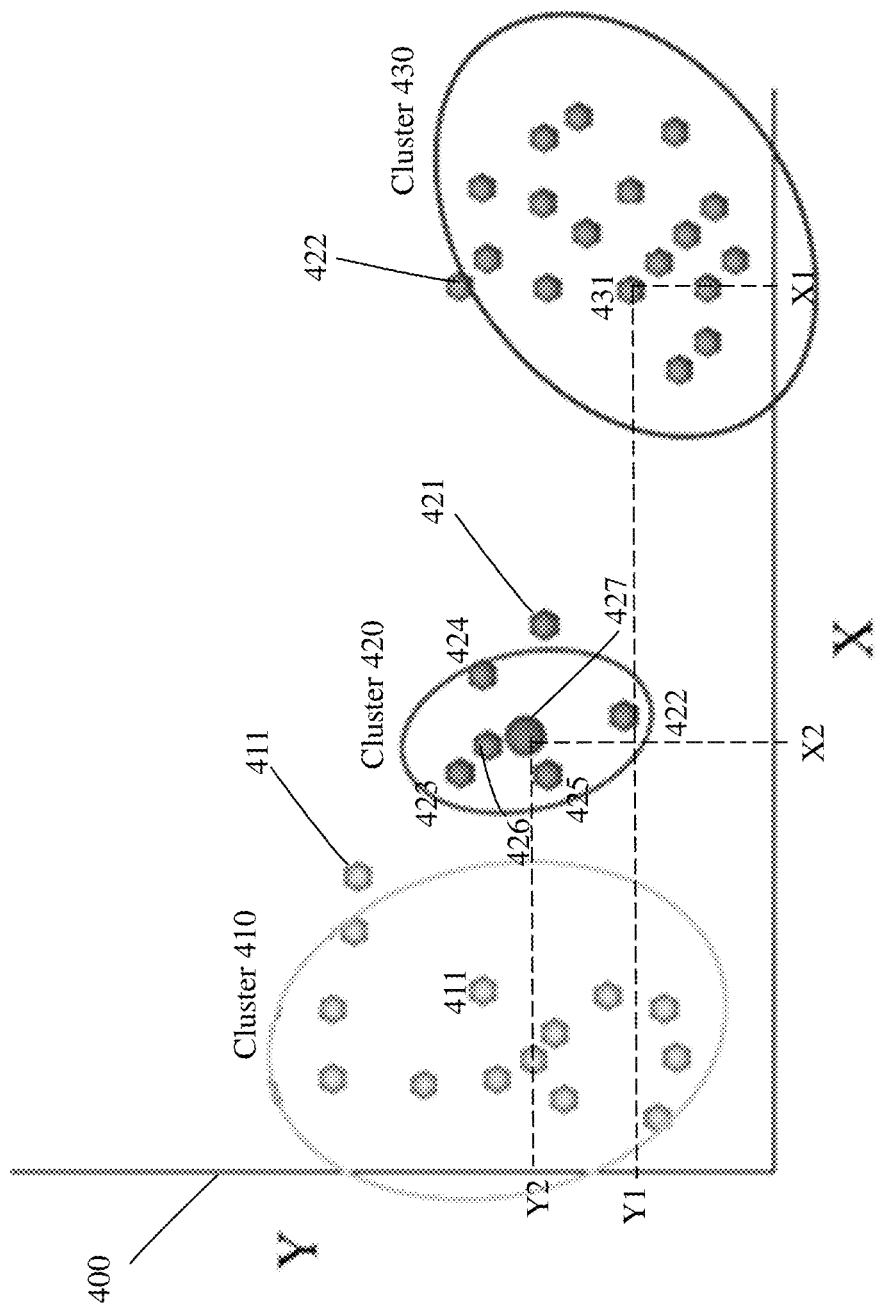

As described in FIGS. 4A-4B, conventional AI supported clustering methods either produce inaccurate results or require high processing power. Because both of the above-mentioned technical challenges are highly undesirable in the technical field of artificial intelligence, there is a desire for a method and system to produce highly accurate results without requiring high processing power. The method 300 addresses the above-mentioned technical deficiencies of the conventional AI models.

Referring now to FIG. 4A, an example of a conventional clustering method is illustrated, in accordance with an embodiment. Graph 400 graphically represents a training dataset including various data points where each data point within graph 400 has an independent attribute/variable and a corresponding dependent attribute/variable. As illustrated in graph 400, each data point has an X attribute (independent value) and a corresponding Y value (dependent value). For instance, data point 431 may have an independent X value (X1) and a corresponding dependent value (Y1).

The dataset depicted in FIG. 4A may be retrieved and generated based on historical data. Therefore, all the data points illustrated in graph 400 (except data point 427) represent known and historical data Therefore, each data point may correspond to a different publicly traded entity where the X-axis corresponds to a cash flow value of a public entity and the Y-axis corresponds to a NAV of the public entity. For instance, data point 431 may represent public entity A where X1 is a cash flow value of the public entity A and Y1 represents the value of public entity A.

FIGS. 4A-B illustrate how a conventional AI model clusters the dataset depicted in graph 400 to predict Y values associated with an unknown data point (e.g., data point 427). For instance, an AI model may be trained to receive X2 and predict Y2.

In some embodiments, conventional AI models may use various clustering methods (e.g. KNN) to generate multiple clusters within the training dataset. KNN is a non-parametric method used for classification and regression. For instance, conventional AI models may generate cluster 410, cluster 420, and cluster 430. Also as depicted, the above-described clusters may not include outlier data, such as data point 411, 421, and 422. Conventional AI models first determine a cluster corresponding to the independent attribute of the new/unknown data point. Subsequently, based on the dependent value of the known data points within the identified cluster, conventional AI models may determine/predict a dependent attribute for the new data point.

For example, when predicting a dependent attribute for data point 427 (Y2), the AI model may first retrieve/determine an independent attribute of the data point 427 (X2). In some embodiments, the independent attribute (X2) may be inputted by a user. Based on the X2 value, conventional AI models determine that the data point 427 corresponds to cluster 420. This is because the X2 value of the data point 427 is within a predetermined threshold of the X value for other data points within the cluster 420. Conventional AI models may use the dependent attributes of the data points within cluster 420 predict a dependent attribute of the data point 427 (Y2).

The conventional AI models use two methods to predict the dependent attribute of a new data point. First, the conventional AI models calculate the dependent attribute of the new data point by averaging the dependent attributes for the data points within the identified cluster. For instance, to identify the Y2 value, conventional AI model may determine an average for the Y values of data points 422-426. This method may not produce highly accurate results. Second, the conventional AI models may generate a weighing factor based on the data points within the identified cluster. In this method, the conventional AI model may first calculate a pairwise distance for each data point within the identified cluster, create a distance matrix, and generate a weight factor to be applied to the independent attribute of the new data point.

Referring now to FIG. 4B, an example of a pairwise distance matrix is illustrated. As described above, in traditional KNN clustering methods, the AI model may calculate pairwise distance between data points within a cluster to improve the output accuracy. For instance, to calculate Y2, conventional AI models may be required to calculate a distance between all data points within cluster 420. The conventional AI models may generate a distance matrix, such as distance matrix 440. As depicted, each row and column may represent a particular data point within a cluster and each cell may represent the distance between the corresponding data point represented by its respective column and row. For instance, cell 441 represents the distance between data point 422 and data point 425.

The conventional AI models may use a Euclidean algorithm to calculate each pairwise distance. As a result, the conventional AI models are required to calculate $n \times (n-1)$ combination of distances where n represents a number of data points within a cluster. For instance, conventional AI models must calculate 20 pairwise distances for cluster 420, which includes only five data points (422-426).

Upon calculating the distance matrix 440, the analytics server may also be required to calculate a weight factor for the predicted data point 427. The weight factor may be dynamically calculated based on a distance between a known attribute of the data point 427 (X2) with other data points within the cluster 420 to predict the unknown attribute associated with the data point 427 (Y2). For instance, the weight factor for data point 425 may be higher than the weight factor of data point 422 because data point 427 has a shorter distance to the data point 425 than data point 422. As a result, the predicted attribute of the data point 427 (Y2) is closer to data point 425 than data point 422.

The described second method of predicting Y2 is time-consuming and requires heavy processing power because this method requires the AI model to execute a high number of distance calculations. Furthermore, averaging (first method) or weighting (second method) may still not produce highly accurate results. Therefore, there is a need to produce accurate predictions without consuming a high processing power.

Referring back to FIG. 3, at step 310, the analytics server may generate a dataset comprising a first set of independent data points and a second set of data points dependent on the first set of data points. In order to generate the dataset, the analytics server may retrieve historical data associated with multiple public entities (e.g., publicly traded companies). The dataset may include two separate sets of data comprising different data points. The first set of data points may represent an independent attribute/variable and the second set of data points may represent another attribute that is dependent upon the independent attribute. The analytics server may use this dataset to generate and/or train an AI model.

In a non-limiting example, the dataset may include multiple independent attributes (e.g., cash flow, net income, assets, employee satisfaction) and a corresponding dependent attribute associated with the public entity (e.g., value of the public entity). For instance, each data point may indicate a cash flow value (independent attribute) and a company value (dependent attribute) of a public entity. In another example, each data point may include a value corresponding to total earnings of a public entity (independent attribute) and a corresponding company value (dependent attribute). In some embodiments, the analytics server may sort the dataset into different groups consisting of uniform attributes. For instance, the dataset may be divided into subgroups (e.g., clusters) where data points within each subgroup share an independent and dependent attributes. For instance, the analytics server may sort the dataset into a subgroup corresponding to cash flow and another subgroup corresponding to assets.

At step 320, the analytics server may generate a new training dataset. The analytics server may first execute a clustering or grouping algorithm to identify one or more clusters or groups within the original dataset. For instance, the analytics server may execute a KNN algorithm to identify one or more clusters within the dataset. Upon identifying the clusters, the analytics server may generate a new training dataset for each cluster to train the AI model accordingly. In some embodiments, the analytics server may generate the new training dataset for the entire original dataset (step 210) and not limited to the data points within the same cluster or group. The analytics server may generate two new data points for each pair of original data points within a cluster. Therefore, the analytics server may generate a total number of new training data points ($n^2$) for a cluster with n data points.

At step 330, the analytics server may train the AI model based on the new training dataset. The analytic server may train the AI model using any of the training techniques such as regression algorithms, Grading Boosting Regression algorithms, linear regression algorithms and deep neural networks. Upon training the AI model, the analytics server may execute the trained AI model to predict the distance between the dependent value of a data point within the original dataset and a predicted dependent value for new data point.

Figure 3B:
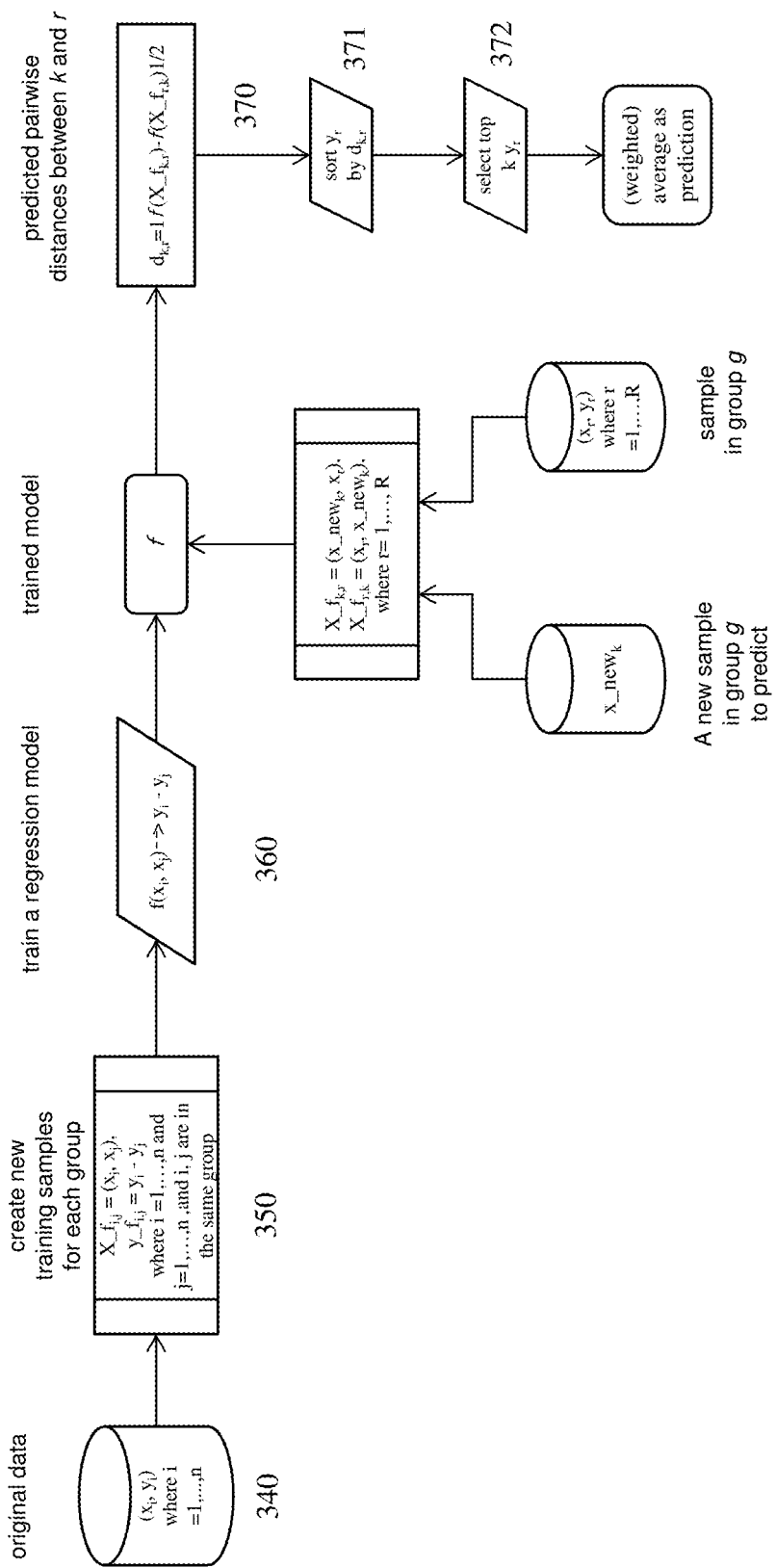

Referring now to FIG. 3B, a flow diagram of a process executed in an AI supported valuation system is illustrated, in accordance with an embodiment. As illustrated in step 340, the analytics server may generate an original dataset where each data point within the original dataset is represented by ($X_i$, $Y_i$). As described above, the original dataset comprises data points corresponding to an independent variable ($X_i$) and a corresponding dependent variable ($Y_i$). In a non-limiting example, $X_i$ may represent an independent attribute (e.g., cash flow, assets, volume of sales, employee satisfaction) of a public entity and $Y_i$ may represent a dependent value, such as the value (net asset value) of the public entity.

As illustrated in step 350, the analytic server may create a new training dataset for each group or cluster within the original dataset. As described above, the analytics server may first execute a clustering algorithm and identify one or more clusters corresponding to the original dataset. The analytics server may create new training data points for each cluster. The analytics server may create two new samples for each pair of data points within the same cluster. For instance, for data points i and j, the analytics server may create two new data points ($X_i$, $X_j$, $Y_i-Y_j$) and/or ($X_j$, $X_i$, $Y_j-Y_i$).

As illustrated in step 360, the analytic server may train the AI model (represented by function "f") based on the new training datasets. As described above, the analytic server may use a variety of regression or other training methods to train the AI model. The analytics server may train the AI model to predict the distance between different data points within a cluster. Therefore, in contrast with conventional methods of averaging the distance or weighing the distance between different data points within a cluster, the analytics server may predict a more accurate distance by training the model based on the distance itself. For instance, the analytics server may execute the trained model using $X_{new}$ to predict a dependent value (e.g., $Y_{new}$) by predicting the distance between $Y_{new}$ and other data points within a cluster (e.g., group g). For instance, when the user inputs Xnew, the analytics server identifies that $X_{new}$ belongs to group g, and predicts the distance between $Y_{new}$ and other Y values within group g.

The trained AI model can calculate the pairwise distance between $X_{new}$ and $X_r$ where $X_r$ represents each X value of the data points within the identified cluster. Ideally, the training model should be symmetric with respect to i and j values. However, because the training model is not guaranteed to be symmetric, the analytics server may use the following formula as the predicted distance to preserve the symmetry (step 370):

$$d_{k,r} = |f(X_k f_{k,r}) - f(X_r f_{r,k})|/2$$

In some embodiments, the analytics server may determine multiple predicted values ($Y_r$), sort the value, and select the top value (step 371) or use the weighted average as prediction (step 372).

In a non-limiting example, the analytics server may receive a request to calculate value of a company Z using methods and systems described herein (e.g., FIG. 3B). The analytics server may determine the value of company Z using three other companies 1-3, as illustrated below in Table 4a:

TABLE 4a

| company | X_1 (debt) | X_2 (sales) | Y (Value) |
|---|---|---|---|
| Z | 100 | 200 | ? |
| 1 | 60 | 150 | 10 |
| 2 | 60 | 160 | 20 |
| 3 | 110 | 200 | 15 |

As illustrated above, the analytics server may use two independent variables ($X\_1$ representing debt associated with each company and $X\_2$ representing sales of each company). As illustrated in step 350, the analytics server may generate new data points as illustrated in Table 4b:

TABLE 4b

| Company pair | $X_i, X_j$ | $Y_i-Y_j$ |
|---|---|---|
| comp1, comp2 | [60,150,60,160] | −10 |
| comp2, comp1 | [60,160,60,150] | 10 |
| comp1, comp3 | [60,150,110,200] | −5 |
| comp3, comp1 | [110,200,60,150] | 5 |
| comp2, comp3 | [60,160,110,200] | 5 |
| comp3, comp2 | [110,200,60,160] | −5 |

The analytics server may train the artificial intelligence models using the newly generated data points. The analytics server may then create the following table that uses known values of companies 1-3 and company Z, as illustrated in Table 4c:

TABLE 4c

| Company pair | $X_i, X_j$ | $Y_i-Y_j$ |
|---|---|---|
| comp1, compZ | [60,150,100,200] | ? |
| compZ, comp1 | [100,200,60,150] | ? |
| comp2, compZ | [60,150,100,200] | ? |
| compZ, comp2 | [100,200,60,150] | ? |
| comp3, compZ | [110,200,100,200] | ? |
| compZ, comp3 | [100,200,110,200] | ? |

The analytics server may use the model trained in step 360 to predict the $Y_i-Y_j$ in Table 4c and calculates the following values, illustrated in Table 4d:

TABLE 4d

| Company pair | $Y_i-Y_j$ |
|---|---|
| comp1, compZ | 1 |
| compZ, comp1 | −1 |
| comp2, compZ | 2 |
| compZ, comp2 | −3 |
| comp3, compZ | 3 |
| compZ, comp3 | 0 |

The analytics server then calculates the table below illustrating the distances of various data points:

TABLE 4e

| Company pair | $Y_i-Y_j$ |
|---|---|
| d_z,1 | [1−(−1)/2=1 |
| d_z,2 | (2+3)/2=2.5 |
| d_z,3 | (3+0)/2=1.5 |

As illustrated in Table 4e, company 1 is closest to company Z with company 3 and then company 2 following. The analytics server may sort the companies based on their respective distance value (i.e., company 1, company 3, and company 2). In some configurations, the analytics server may average the values for company 1 and 3 using equal weights to estimate a value for company Z, as illustrated below:

$(y\_1+y\_3)/2=(10+15)/2=12.5$

Therefore, the analytics server calculates the value for company Z to be 12.5. In some configurations, the analytics server may weight the results based on each respective company's distance to company Z.

Using the method described in FIG. 3B, the analytics server may identify the independent variables that give rise to a dependent variables that may be clustered together. For instance, when company 1 and company 2 are in a cluster (e.g., both companies have a dependent variable (i.e., valuation) that are reasonably similar), the analytics server may identify what independent variable corresponding to these companies are reasonably similar that caused these companies to be clustered together. As a result, the analytics server may identify counter intuitive relationships for companies that may or may not be similar. For instance, that two dissimilar companies have both have an independent variable that are reasonably close to the valuation of each company. Therefore, the analytics server can predict the first company's valuation using the second company's characteristics.

Using the valuation approach described herein, the analytics server may accurately value a portfolio of public companies using approximately 14 accounting variables taken from publicly released quarterly financial statements and the daily stock prices of comparable firms. Due to using the machine-learning and other algorithms described herein, the valuation is reasonably accurate. The analytics server may iteratively train the model(s) described herein over time and throughout various economic cycles to improve the valuation's accuracy. Using the methods and systems described herein, the analytics server may value public equities using a quantitative approach, allowing market participants to value private equities (accounting variables taken from private companies, which are anonymized and published on an electronic platform provided by the analytics server and daily stock prices of comparable public firms).

Figure 4C:
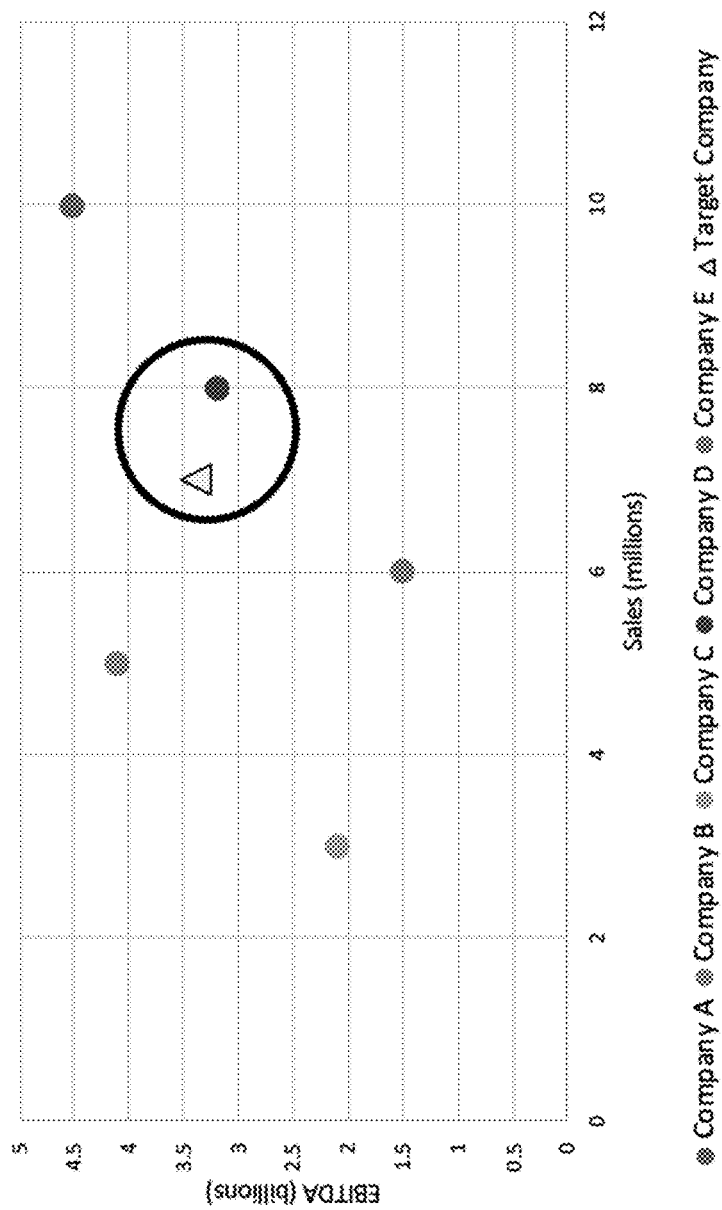
FIG. 4C is a visual representation of identifying a nearest neighbor given a dataset, in accordance with an embodiment.

FIG. 4C illustrates the connection between financial transparency and valuation in both the public and private markets, according to an embodiment. FIG. 4C also compares how companies (either private or public) are often valued using conventional approaches termed "multiples analysis" and how the methods and systems described herein improve these conventional solutions. The analytics server may use various more sophisticated market participant techniques, such as regression analysis, to refine the results produced by multiples analysis. FIG. 4C also illustrates how the analytics server utilizes machine learning and the logic of "multiples analysis" and the advantage of "big data analytics" to enhance regression approaches utilized by conventional software solutions.

Conventionally, investment practitioners frequently use comparable companies to value a company that they are considering buying or selling. The comparable company method is very similar to using the sales prices from homes in your neighborhood to determine the value of a house. Real estate appraisers find comparable homes, calculate an average value, and then make adjustments to account for your home's specific characteristics.

Comparable company valuation is also referred to as "multiples" analysis. For instance, assume the following is true for ABC Company, a hypothetical example illustrated in Table 5. The value of ABC Company's stock price multiplied by the number of shares outstanding is worth $425 million. This value is the market capitalization of ABC Company. Analysts will then review financial statements for metrics that are associated with market value. One common metric is Earnings, before Interest, Taxes, Depreciation, and Amortization (EBITDA). ABC Company's EBITDA, over the last twelve months, was $40 million. If an analyst then divides ABC Company's market capitalization by its EBITDA, the analyst calculates a "multiple" of 10.6. If that analyst then wanted to quickly estimate a value for a second company, which does not have a market capitalization, XYZ Corp., the analyst could multiply XYZ Corp's EBITDA of $12 million times the EBITDA Multiple of 10.6 to estimate the public market value of $127.2 M.

TABLE 5

| ABC Company, (trailing twelve month finoncial data) | |
|---|---|
| Market Capitalization | $425 M |
| Earnines before interest, Taxes. Depreciation, and Amortization (EBITDA) | $40 M |
| EBITDA Multiple | 10.6 |
| XYZ Company, (trolling twelve month financial data) | |
| Market Value | Unknown |
| EBITDA | $12 M |
| Assumed EBITDA multiple from ABC Company | 10.6 |
| Implied Value | $127.2 M |

In this simple example, the analyst estimates the value of XYZ by finding a comparable company, calculating the EBITDA Multiple, and then multiplying the EBITDA multiple times XYZ's EBITDA. As illustrated, a valuation of $127 M in not an accurate valuation of this company. However, the EBITDA multiple may be reliable enough that it is widely used by practitioners, especially when triangulating potential market values of a private company.

In addition to the above-described technical advantages, the methods and systems described herein may improve the accuracy of conventional valuation processes. Statistical approaches, such as regression models or machine learning, may improve multiples analysis. In the example illustrated in Table 5 above, the calculation of the value of XYZ Corp. used only one comparable company, ABC Company, and one ratio: ABC Company's Market Capitalization to EBITDA. Disclosed methods and system utilized by the analytics server may more accurately estimate XYZ Corp's value in two ways. First, the analytics server may include more ratios in the analysis. For instance, the analytics server may compare ABC Corp's Market Capitalization to Revenue. Second, the analytics server may include additional publically traded comparable companies in the analysis. Therefore, instead of solely relying on ABC Company's EBITDA Multiple, the analytics server may calculate the EBITDA multiple of other publically traded comparable companies and then utilize the average or median EBITDA multiple of the comparable company set.

If an analyst is estimating the value of portfolio of companies, rather than a single company like XYZ Corp., then the analytics server may utilize a third method to increase the accuracy of basic "multiples valuation." In some configurations, the analytics server may increase the diversity of the portfolio, increasing the number of companies and the number of different kinds of companies. As expected, in any statistical method, there may be estimation error (e.g., noise). However, when the analytics server increases the diversity of the portfolio, given certain assumptions, the "noise" may be reduced. Therefore, if the analytics server has an average error of plus or minus 10% when estimating the value of a single company, the error associated with estimating the entire portfolio can be much lower than 10%. This may be due to the analytics server reducing the error margins by aggregating some overestimates with some underestimates.

Frequently, private equity (PE) valuation is time consuming, tedious, and produces inaccurate results because a broad set of variables impact the future cash flows of a company. The interactions between variables, and how they change over time, is difficult for analysts to detect. This difficulty is compounded by the voluminous amounts of economic data available for analysis. Moreover, conventional valuation methods are highly dependent upon each analyst's subject understanding of different variables, which produces unreliable and inconsistent results.

Machine learning algorithms (e.g., valuation methods or training methods) described herein) are designed for situations where the amount of data is large, and the interactions between the data are complex, which is nearly impossible for a human analysist to compute using conventional software solutions or other methods.

Unlike other machine learning approaches, which can be a "black box," the techniques disclosed herein improve conventional machine learning and AI techniques used. For instance, many conventional AI-enabled techniques use KNN methodologies. KNN is a method for classification and regression of data. In an example, one can envision a KNN model creating a plot chart. KNN models can plot points that are close to each other on a graph (i.e., neighbors) and identify clusters of data. In an illustrative example, there may be six companies in a dataset, including the "target company." Conventional software solutions utilizing KNN may be utilized to identify a nearest neighbor for the target company. As illustrated, the dataset may include data corresponding to sales and EBITDA for each company. Conventional software solution could plot each company on a chart, placing sales on the X-axis and EBITDA on the Y-Axis. Using KNN, conventional software solutions would then compute the distance between each plot point. As illustrated in FIG. 4C, Company D has the closest distance to the target company and is, therefore, the nearest neighbor.

The methods and systems described herein enhance the standard and conventional KNN models. Simply put, the analytics server may not try to find comparable companies with the smallest distance between sales and EBITDA, but the smallest "distance" between drivers of economic value (e.g., data points). The economic value of private companies, however, is unknown, except at certain discrete points in time. Market prices for private firms are only available when the equity in the firm is bought or sold, often in private, unobservable transactions. In the normal course of running a PE fund, private companies are purchased in the first several years of the fund and then sold five to seven years later, before the fund closes and returns capital and any profit to investors. In between those points, valuations conducted by the management of the private company or PE fund sponsors are only estimates.

To value the target company on a daily basis, the analytics server can adapt the guideline public company and traditional KNN machine learning approaches by conceptually following five steps:

First, the analytics server may estimate the value of the "target company" by comparing its economic sector and accounting data to the economic sector, accounting data, and market price of publicly traded firms. For this step, the analytics server may use a machine learning, regression-based model broadly referred to as the "Gradient Boosting Tree" method. Once this step is complete, the analytics server can estimate the market value, enterprise value, or other metrics for the target company.

Second, the analytics server may compute estimated "multiples" (or some other measure of economic value) for the target company. For instance, the analytics server may divide the estimated enterprise value (EV) of the target company by its actual EBITDA to get an estimated EV/EBITDA ratio.

Third, the analytics server may measure the distance between the estimated EV/EBITDA ratio of the Target Company versus the actual EV/EBITDA ratio of all public companies in the same sector. The public company with the smallest distance between estimated and actual EV/EBITDA ratio would be considered the "nearest neighbor." The approach may be broadly referred to as DKNN. Furthermore, the analytics server can compare the distance of one estimated metric versus one actual metric to find the nearest neighbor (as we illustrated above) or may calculate the distance between multiple metrics and weight each one.

The number of metrics utilized in DKNN can change over time or by sector. While the analytics server utilizing the machine learning and AI algorithms can recommend which metrics to use, in some configurations, valuation and finance experts can select the metrics recommended by the analytics server and determine the ideal number of metrics to use-often fewer than five. Manual changes to the model will be governed by a governance framework. Simply put, machine learning may augment/improve and not automate valuation of complex assets.

Fourth, the analytics server may determine the number of nearest neighbors to include in the comparison set for the target company. The machine learning models utilized by the analytics server may dynamically "learn" the optimal number of neighbors by using machine learning approaches.

Fifth, at this point, the analytics server may have estimated the value of the target company using a regression model. The analytics server may also have identified comparable public companies for the target company using the DKNN approach. The comparable companies may be all public companies that are valued by the market on a similar economic basis. The analytics server may then track the changes in market value of the comparable companies and apply the same changes to the estimated value of the target company. Thus, the analytics server can estimate a public market equivalent price for any equity, public or private, using machine learning to implement an industry standard multiples analysis approach.

Figure 4D:
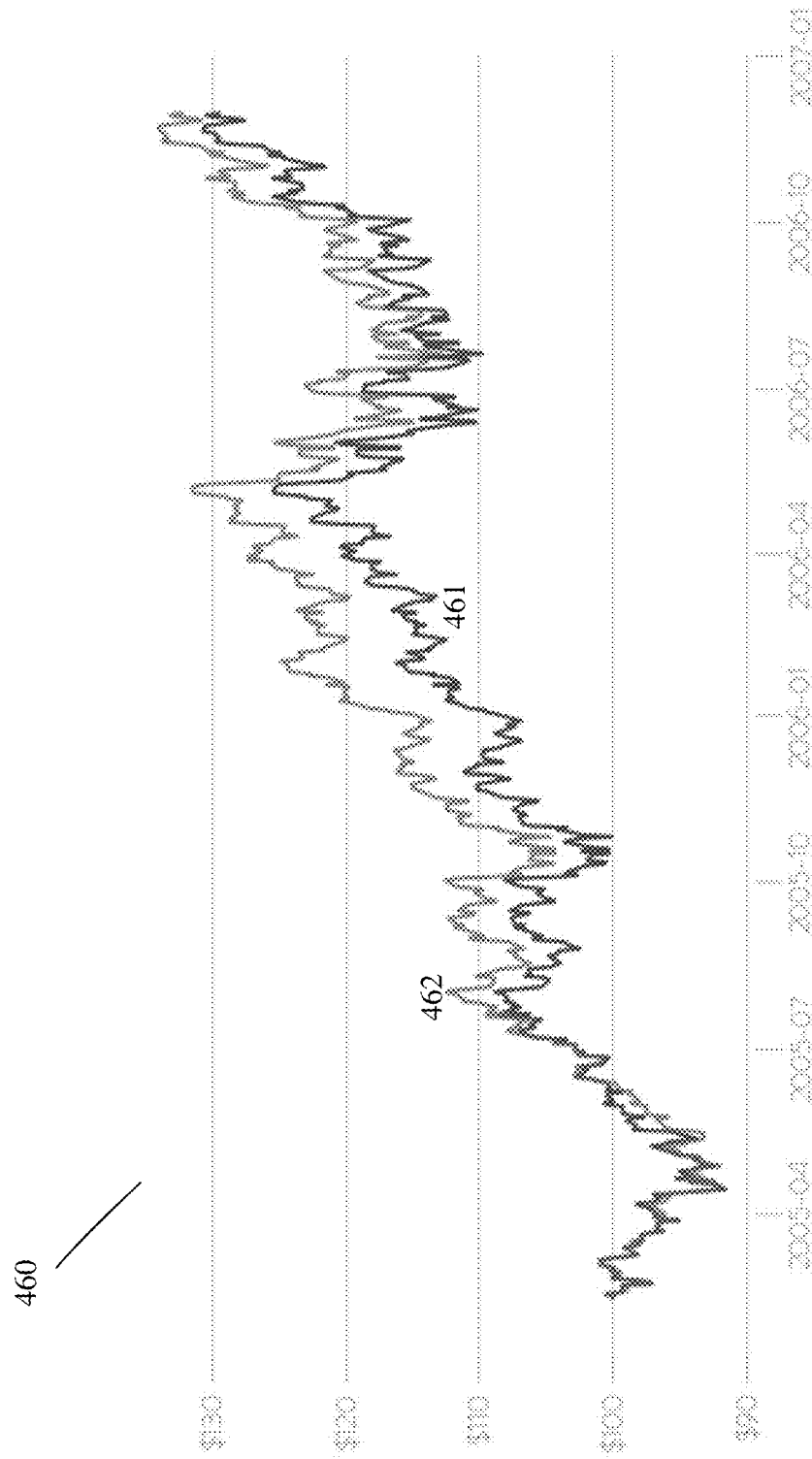
FIG. 4D illustrates implementing the methods and systems described herein on a portfolio of public entities, in accordance with an embodiment.

FIG. 4D illustrates how the valuation method described above is tested on a portfolio of public equities, in accordance with an embodiment. Chart 460 illustrates an experiment to randomly create a portfolio of 100 public companies and to estimate the value of all 100 public companies to compare the total estimated market capitalization to the total actual market capitalization for the same 100 public companies.

For the illustrated experiment, the analytics server utilized a Gradient Tree Boosting method to estimate the market capitalization of a target company and a simplified version of the DKNN model, detailed above, was also used to find comparable public companies. The analytics server utilized 14 financial statement data points and market capitalization as inputs to train the Gradient Tree Boosting model. The metrics selected are frequently used by practitioners for valuation and available from most private equity firms to which we have spoken. Table 6 provides a list of the metrics used in the model as well as their relative importance during different business cycles.

The Gradient Tree Boosting model may be "retrained" quarterly or based on any other frequency. As market participants weight certain financial statement metrics differently during changing economic cycles, the analytics server may trains the models accordingly. For instance, pre-crisis of 2008, the level of sales was an important consideration for analysts but during the crisis, analysts placed more emphasis on net income. These changes make intuitive sense: before the crisis, analysts were optimistic and more concerned with a company's absolute sales. During the crisis, analysts were more pessimistic, and were ultimately worried about a firm's survival, and therefore were more concerned about profit. Overall, however, the five most important accounting metrics were relatively consistent throughout the test period.

TABLE 6

VARIABLE IMPORTANCE SCORE

| VARIABLE | BEFORE CRISIS | DURRING CRISIS | AFTER CRISIS |
| --- | --- | --- | --- |
| EBITDA | 0.20 | 0.23 | 0.24 |
| Net Income | 0.15 | 0.23 | 0.21 |
| CAPEX | 0.14 | 0.11 | 0.14 |
| Total Debt | 0.13 | 0.12 | 0.09 |
| Sales | 0.12 | 0.09 | 0.11 |
| EBITDA Margin | 0.04 | 0.06 | 0.04 |
| Debt to EBITDA | 0.04 | 0.02 | 0.05 |
| Operating EBIT | 0.04 | 0.03 | 0.05 |
| Debt to Equity | 0.03 | 0.03 | 0.02 |
| Annual Dividend Payout (% Earnings) - Total Dollar | 0.03 | 0.01 | 0.02 |
| Return on (average) assests | 0.02 | 0.01 | 0.01 |
| Interest Expense | 0.02 | 0.03 | 0.02 |
| Return on (average total) equity | 0.02 | 0.02 | 0.01 |
| Sales Growth | 0.01 | 0.01 | 0.01 |

The values in Table 6 may represent the average variable importance score during the corresponding business cycle. The larger the value, the greater the importance during that business cycle. Importance may change over time. For example, CAPEX is more important than total debt before the crisis, but not during the crisis. Utilizing the methods and systems described herein the analytics server may be able to estimate the total value of a 100 company portfolio with less than 5% prediction error on average. Line 461 is the actual value of the companies and line 462 represents the valuation calculated using the methods and systems described herein.

Figure 7:
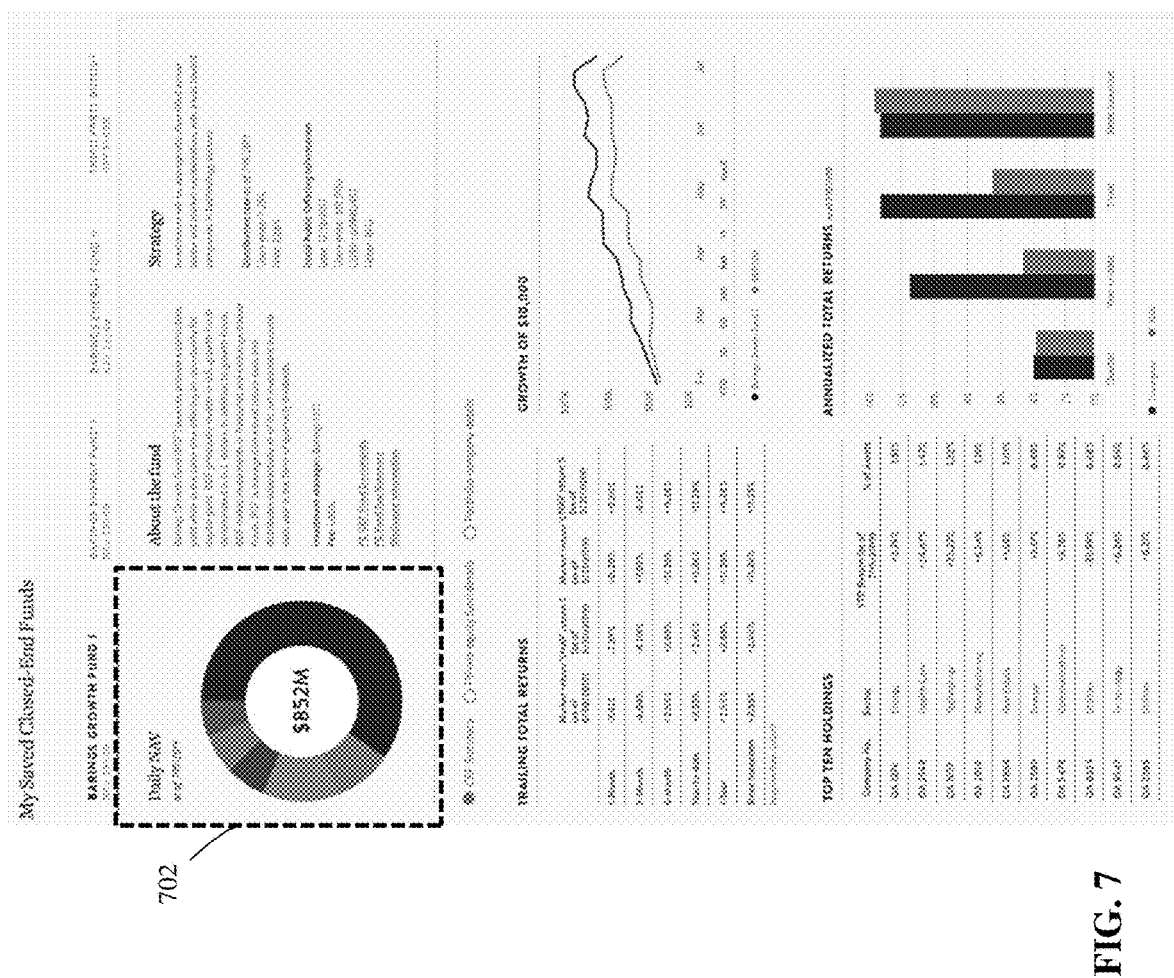

FIG. 7 illustrates a graphical user interface generated by the analytics server, in accordance with an embodiment. GUI 700 illustrates a web page that may be viewed by a closed end fund manager or other end users. GUI 700 may include a graphical component 702 that illustrates a daily NAV for private entity closed end fund (PE CEF). Each day, the PE CEFs can post an independently estimated NAV on an electronic platform (e.g., website) provided by the analytics server. Investors can view details about the estimated NAV at the PE CEF, PE Fund, and portfolio company levels. If investors click on (or otherwise interact with) a section of the pie-chart displayed in the graphical component 702, the analytics server may display the estimated NAV by economic sector for private equity investments as well as the percentage of holdings held in other investments, such as cash, treasuries, and exchange-traded funds. Investors can further evaluate the NAV by clicking "PE Fund Details" or "Portfolio Company Details" illustrated in GUI 700.

GUI 700 may also include daily updates of portfolio allocation. As capital calls are made by PE funds, or distributions are received, the NAV of each PE CEF will change. The analytics server may display this information to investors daily. GUI 700 may also include performance history of various PEs within the CEF. Each PE CEF may have charts and tables that display the fund's performance history over different periods of time and compared to appropriate indexes. The GUI 700 may also include top ten holdings of the CEF. The analytics server may display the top ten holdings of underlying portfolio companies. Top holdings may be the private equity companies with the greatest market value weight in the closed end fund portfolio. Top holdings may be determined by the market value they comprehensively represent within the total portfolio.

Figure 8:

FIG. 8 illustrates a graphical user interface generated by the analytics server, in accordance with an embodiment. GUI 800 illustrates a web page that may be viewed by a closed end fund manager or other end users. GUI 800 illustrates private equity fund details. In an embodiment, once an end user reviews the summary "tab" of BGF, the end user may click on (or otherwise interact with) the "Private equity fund details" graphical button to learn more about the private equity funds in which BGF has investments. The analytics server may then display an estimated NAV for each PE fund, such as Boston Capital Partners and Springfield Holdings (hypothetical PE funds illustrated herein). The analytics server may use the methods described herein to estimate the value of each underlying portfolio company and then aggregates the value of each portfolio company. The GUI 800 may also include performance metrics for each PE fund. As an example, for Boston Capital Partners, GUI 800 may display the internal rate of return to date, the amount of capital committed, funded, and distributed, as well as other helpful data.

GUI 800 may anonymize the names of each portfolio company so that each company can continue to operate with the benefits of private ownership-benefits that may be passed on to retail investors in the form of anticipated premium over the S&P 500 index. Each private equity company may be tracked by the analytics server using an assigned number. For each company, the analytics server may display the market sector, independent estimate of NAV, and select financial statement data.

GUI 800 may also include financial statements details shared with Investing public. All investors can access select financial statement information from each portfolio company's financial statements (e.g., revenue and EBITDA) a feature that allows investors to value each portfolio company on "multiples" basis. The analytics server may collect the financial statement information from private equity funds on their underlying portfolio companies quarterly and maintains a history of the financials within our database.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A method comprising:
   receiving, by a server, transaction data associated with a fund comprising a plurality of private entities, the transaction data corresponding to a proportion of the fund associated with each private entity, shares purchased of each private entity, and purchase price for the shares purchased of each private entity;
   executing, by a server, a set of artificial intelligence models to identify a plurality of comparable public entities to each private entity, the set of artificial intelligence models comprising at least a first artificial intelligence model utilizing a learned distance k-nearest algorithm to identify the plurality of comparable public entities, a second artificial intelligence model utilizing a linear regression algorithm to identify the plurality of comparable public entities, and a third artificial intelligence model utilizing a boosting tree regression algorithm to identify the plurality of comparable public entities, wherein the set of artificial intelligence models are trained in accordance with a training dataset comprising known attributes of a set of public entities and a corresponding valuation for each public entity within the set of public entities;
   retrieving, by the server, financial data associated with the identified comparable public entities;
   determining, by the server, a value for each private entity based upon its respective identified plurality of comparable public entities; and
   displaying, by the server on a graphical user interface in real time, an indicator of a value of the fund, the graphical user interface comprising a value of each private entity within the fund where an identify of each private entity is anonymized.

2. The method of claim 1, wherein the server dynamically updates the indicator in real time in accordance with modifications in financial data associated with the identified comparable public entities.

3. The method of claim 2, wherein the graphical user interface displays a trend associated changes associated with the updated indicator for a predetermined time.

4. The method of claim 1, wherein the identified comparable public entities are also displayed on the graphical user interface.

5. The method of claim 1, wherein an application programming interface protocol notifies the server when any financial data of an identified comparable public entity has been modified.

6. The method of claim 1, further comprising:
   crawling, by the server, one or more databases to identify one or more web documents associated with at least one private entity; and
   displaying, by the server, an indicator on the graphical user interface indicating identification of at least one web document associated with at least one private entity.

7. The method of claim 1, wherein the graphical user interface further displays a value of each private entity within the fund.

8. The method of claim 1, wherein the graphical user interface further displays a second value of the fund received from a user computing device.

9. The method of claim 3, wherein the period of time is customizable by a user interacting with the graphical user interface.

10. The method of claim 9, wherein the server retrieved the financial data in real time.

11. A computer system comprising:
    one or more electronic data sources configured to store financial data associated with a set of public entities; and
    a server connected to the one or more electronic data sources, the server having at least one processor configured to:
      receive transaction data associated with a fund comprising a plurality of private entities, the transaction data corresponding to a proportion of the fund associated with each private entity, shares purchased of each private entity, and purchase price for the shares purchased of each private entity;
      execute a set of artificial intelligence models to identify a plurality of comparable public entities to each private entity, the set of artificial intelligence models comprising at least a first artificial intelligence model utilizing a learned distance k-nearest algorithm to identify the plurality of comparable public entities, a second artificial intelligence model utilizing a linear regression algorithm to identify the plurality of comparable public entities, and a third artificial intelligence model utilizing a boosting tree regression algorithm to identify the plurality of comparable public entities, wherein the set of artificial intelligence models are trained in accordance with a training dataset comprising known attributes of the set of public entities and a corresponding valuation for each public entity within the set of public entities;
      retrieve, from the one or more electronic data sources, financial data associated with the identified comparable public entities;
      determine a value for each private entity based upon its respective identified plurality of comparable public entities; and
      display, on a graphical user interface in real time, an indicator of a value of the fund, the graphical user interface comprising a value of each private entity within the fund where an identify of each private entity is anonymized.

12. The computer system of claim 11, wherein the server dynamically updates the indicator in real time in accordance with modifications in financial data associated with the identified comparable public entities.

13. The computer system of claim 12, wherein the graphical user interface displays a trend associated changes associated with the updated indicator for a predetermined time.

14. The computer system of claim 11, wherein the comparable public entities are also displayed on the graphical user interface.

15. The computer system of claim 11, wherein an application programming interface protocol notifies the server when any financial data of an identified comparable public entity has been modified.

16. The computer system of claim 11, wherein the server is further configured to:
   crawl one or more databases to identify one or more web documents associated with at least one private entity; and
   display an indicator on the graphical user interface indicating identification of at least one web document associated with at least one private entity.

17. The computer system of claim 11, wherein the graphical user interface further displays a value of each private entity within the fund.

18. The computer system of claim 11, wherein the graphical user interface further displays a second value of the fund received from a user computing device.

19. The computer system of claim 13, wherein the predetermined time is customizable by a user interacting with the graphical user interface.

20. The computer system of claim 11, wherein the server retrieved the financial data in real time.

\* \* \* \* \*